(12) United States Patent
Schiffmann et al.

(10) Patent No.: US 9,927,230 B2
(45) Date of Patent: Mar. 27, 2018

(54) METHOD AND APPARATUS FOR DETECTING THE FITNESS FOR CIRCULATION OF A VALUE DOCUMENT

(71) Applicant: GIESECKE & DEVRIENT GMBH, Munich (DE)

(72) Inventors: Peter Schiffmann, Munich (DE); Jan Domke, Vaterstetten (DE); Friederike Lichtenegger, Pullach im Isartal (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 162 days.

(21) Appl. No.: 14/838,667

(22) Filed: Aug. 28, 2015

(65) Prior Publication Data

US 2016/0084645 A1    Mar. 24, 2016

(30) Foreign Application Priority Data

Sep. 18, 2014  (DE) .......................... 10 2014 013 916

(51) Int. Cl.
| | |
|---|---|
| *G01B 17/02* | (2006.01) |
| *G01B 11/06* | (2006.01) |
| *B42D 25/30* | (2014.01) |
| *G01B 21/08* | (2006.01) |

(52) U.S. Cl.
CPC ............ *G01B 17/02* (2013.01); *B42D 25/30* (2014.10); *G01B 11/06* (2013.01); *G01B 21/08* (2013.01); *G01B 2210/46* (2013.01)

(58) Field of Classification Search
CPC ........ G01B 17/02; G01B 11/06; G01B 21/08; G01B 2210/46; B42D 25/30

USPC ........................................................... 73/632
See application file for complete search history.

(56) References Cited

U.S. PATENT DOCUMENTS

| | | | |
|---|---|---|---|
| 3,634,012 A | 1/1972 | Mustert | |
| 3,800,155 A | 3/1974 | Potenza | |
| 8,510,062 B2 | 8/2013 | Domke et al. | |
| 2007/0122023 A1* | 5/2007 | Jenrick | G07D 7/162 382/135 |
| 2009/0312957 A1 | 12/2009 | Domke et al. | |
| 2010/0005888 A1* | 1/2010 | Domke | G07D 7/00 73/596 |
| 2010/0132470 A1* | 6/2010 | Domke | G01N 29/11 73/642 |
| 2012/0140791 A1* | 6/2012 | Lawandy | G07D 7/185 374/45 |
| 2013/0323432 A1 | 12/2013 | Rygas et al. | |
| 2014/0338457 A1* | 11/2014 | Domke | G07D 7/08 73/632 |

(Continued)

FOREIGN PATENT DOCUMENTS

| | | |
|---|---|---|
| DE | 2005016 A1 | 1/1971 |
| DE | 102006033001 A1 | 1/2008 |

(Continued)

*Primary Examiner* — Natalie Huls
*Assistant Examiner* — Monica S Young
(74) *Attorney, Agent, or Firm* — Workman Nydegger

(57) ABSTRACT

A method for detecting the fitness for circulation of a value document, includes the steps of: a) carrying out a measurement of the thickness on a tactile structure of the value document, and b) comparing the measured thickness with a previously known target thickness of the tactile structure in order to establish the fitness for circulation.

14 Claims, 3 Drawing Sheets

(56) References Cited

U.S. PATENT DOCUMENTS

2014/0355818 A1* 12/2014 Scholz .................... G07D 7/08
  382/100

FOREIGN PATENT DOCUMENTS

| DE | 102010026949 A1 | 1/2012 |
| DE | 102011121913 A1 | 6/2013 |
| EP | 2345009 B1 | 6/2013 |
| EP | 2483631 B1 | 1/2014 |

* cited by examiner

METHOD AND APPARATUS FOR DETECTING THE FITNESS FOR CIRCULATION OF A VALUE DOCUMENT

BACKGROUND

The present invention concerns a method and an apparatus for detecting the fitness for circulation of a value document, such as a bank note.

Tactile structures are frequently provided on such value documents in order that persons with impaired or no vision, for example, can recognize the value documents on the basis of the tactile structures.

Such tactile structures are produced for example by means of embossing methods (e.g. engraving) and are well recognizable e.g. by means of mechanical scanning or a microscopic measuring method when the value document is in a new condition. Due to the circulation of the value document there occurs a degeneration of the embossed tactile structure so that, in the worst case, the embossing is no longer perceptible e.g. due to moisture, temperature, pressure and mechanical abrasion. There ultimately remains only a small haptic difference relative to the surroundings which, in the case of an ink-carrying engraving, is to be attributed to the microroughness of the engraving ink. With tactile structures that are based on a partial material thickening (e.g. screen printing, ink-jet printing, foil transfer), the preservation of tactile structures in circulation of the value document is guaranteed better. In this case, the reduction of the tactility in circulation happens e.g. through splintering off of the ink/foil or mechanical abrasion.

SUMMARY

On these premises, it is the object of the invention to provide a method for detecting the fitness for circulation of a value document having a tactile structure.

According to the invention, this object is achieved by a method for detecting the fitness for circulation of a value document, which has the following steps:
a) carrying out a measurement of the thickness of a tactile structure of the value document, and
b) comparing the measured thickness with a previously known target thickness of the tactile structure in order to establish the fitness for circulation.

The change of the thickness of the tactile structure can be easily ascertained through the thickness measurement and the comparison with the previously known target thickness. In dependence on the size of the deviation it can then be specified whether the value document is still fit for circulation and therefore has the desired fitness for circulation, or simply fitness.

The thickness measurement can be in particular an ultrasonic measurement. By ultrasonic measurement the thickness of the tactile structure can be measured well with the desired exactness, so that it is therefore easily ascertainable on the basis of the comparison with the target thickness which changes of the thickness of the tactile structure in comparison to the target thickness are present. In dependence on the size of the deviation it can then e.g. be specified whether or not the value document is still fit for circulation.

In the method according to the invention, in step a) ultrasound can be directed onto the value document from a first side and be detected on the other side of the value document after traversal of the value document. The ultrasonic measurement is therefore carried out in transmission. The attenuation of the ultrasound effected through the value document can thus be easily measured with the desired exactness.

For carrying out these steps, the value document can be arranged between an ultrasonic transmitter and an opposing ultrasonic receiver.

In particular, in step a) the thickness of the tactile structure can be measured at different positions of the tactile structure. This can be utilized for measuring the thickness of the tactile structure with higher exactness, on the one hand. It can also be used to determine a lateral dimension of the tactile structure, on the other hand. The thus determined lateral dimension can be utilized for determining the fitness for circulation.

Further, steps a) and b) in the method according to the invention can be carried out for at least a second tactile structure, whereby the lateral distance of the two tactile structures can be utilized for determining the fitness for circulation.

Fitness for circulation can be determined in particular on the basis of wear and/or soiling of the value document. Thus, fitness for circulation can be established as being present when the measured thickness of the tactile structure deviates from the previously known target thickness by more than a predetermined limiting value.

Further, in the method according to the invention, the target thickness can be determined on the tactile structure of a mint-condition value document (e.g. by means of an ultrasonic measurement). This then serves as the target thickness for the value documents having such a tactile structure which are manufactured in the same way.

There is further provided an apparatus for detecting the fitness for circulation of a value document, having a measurement module for carrying out a thickness measurement on a tactile structure of the value document in order to establish the thickness of the tactile structure, a comparison module for comparing the measured thickness with a predetermined target thickness of the tactile structure in order to establish the fitness for circulation, and a control unit, with the control unit actuating the measurement module for carrying out the thickness measurement and the comparison module for carrying out the thickness comparison.

The apparatus according to the invention can have further modules or units that are necessary for carrying out the method according to the invention (including its developments).

In particular, the measurement module can be configured as an ultrasonic measurement module. The measurement module can have an ultrasonic transmitter and an opposing ultrasonic receiver, with the value document being arranged between ultrasonic transmitter and ultrasonic receiver for the ultrasonic measurement of the tactile structure to be carried out.

Further, the apparatus can have an array of ultrasonic transmitters and an opposing array of ultrasonic receivers. Preferably, there is a one-to-one correspondence between ultrasonic transmitters and ultrasonic receivers. Furthermore, a perforated plate can be arranged between the array of ultrasonic transmitters and the array of ultrasonic receivers, with the perforations being arranged in a same array as the ultrasonic transmitters and/or ultrasonic receivers, and the perforated plate being so arranged that a tunnel through one of the perforations is provided for each pair of ultrasonic transmitter and ultrasonic receiver.

The apparatus according to the invention can additionally or alternatively have one or more further measurement modules. In particular, it can have a mechanical measurement module with which the upper side and/or underside of the value document is scanned mechanically.

Further, the apparatus according to the invention can have an electromagnetic measurement module which comprises a transmitter and a receiver, with the transmitter emitting the electromagnetic radiation at frequencies in the terahertz region and the receiver being sensitive to such rays.

With such an electromagnetic measurement module the thickness of the tactile structure can also be measured well in a similar way to using the ultrasonic module.

The further measurement module can in particular be so configured that it carries out a mechanical scanning, that a laser profilometry or a laser triangulation is carried out. In laser profilometry and laser triangulation, tactility can be established via a shadow cast resulting on the basis of a directed light. Through an image comparison of the plan view with a second image with directed light, and with knowledge of the illumination angle of the directed light, the tactility can be established mathematically. For this purpose, corresponding sensors must be provided. When the value document is moved along a transport direction, a sensor should be arranged transversely to the transport direction, and a sensor in the transport direction. Further, upon the measurement the distance from the sensor should be kept constant through a corresponding provision in order to avoid erroneous measurements. This can be done for example by suction plates, hold-down devices, etc.

Further, electromagnetic radiation (UV, VIS, IR, THz) can be used for detection. A magnetic sensor or a capacitive sensor can also be employed. In particular, the electrical conductivity can be measured. Further, it is possible to measure luminescence properties, anti-Stokes, Stokes behavior, phosphorescence, UV absorption (e.g. $TiO_2$), absorption in the visible wavelength region, IR absorption including thermal absorption in the THz region.

In particular, there can be provided an apparatus for detecting the fitness for circulation of a value document, with the apparatus having an electromagnetic measurement module for carrying out a thickness measurement of a tactile structure of the value document with electromagnetic radiation at frequencies in the terahertz region and a comparison module for comparing the measured thickness with a previously known target thickness of the tactile structure in order to establish the fitness for circulation, and a control unit, with the control unit actuating the electromagnetic measurement module for carrying out the thickness measurement and the comparison module for carrying out the thickness comparison.

There is further provided a value document for the method according to the invention for detecting the fitness for circulation of the value document, with the value document having a substrate and a tactile structure, formed in a region of the substrate, with a thickness differing from the thickness of the bordering region of the substrate such that the thickness difference is capturable by means of a thickness measurement (e.g. an ultrasonic thickness measurement).

In the value document according to the invention, the tactile structure can have a structure element applied to one side of the substrate.

The material of the structure element can differ from the material of the substrate. In particular, the material of the structure element can be a material having one or more phase transitions. Thus, the material can for example contain gas-filled hollow bodies (such as gas-filled hollow spheres).

Further, the tactile structure can be surrounded (at least partly) by a tactile protective structure.

The value document according to the invention can have, besides the one tactile structure, a further tactile structure whose thickness is greater than or equal to the one tactile structure. In particular, the two thicknesses can be equal but with different materials being employed for the structure elements for the two tactile structures. This can lead to different thicknesses upon the ultrasonic measurement.

In this case, a mechanical scanning can be carried out additionally, so that the mechanically scanned thicknesses are equal for the two tactile structures.

The results of the ultrasonic measurement and of the mechanical scanning can be utilized for determining the fitness for circulation.

The tactile structure can be visually visible or only conditionally visible at least in a partial region. Further, it can have partial regions with different colors or color tones. In particular, it can have at least two partial regions that are different in their visual impression. The same can be present in the relation of two tactile structures to each other.

The tactile structure(s) can be visually visible or visible in the infrared region or visible in the UV region. Further, the tactile structure(s) can contain a luminescent substance at least in a partial region.

The thickness of the tactile structure(s), the lateral dimensions of the tactile structure(s) and/or the distance or the arrangement of the tactile structures can be utilized for representing a code and also be evaluated as such.

The described possible features of the tactile structure(s) can be utilized in the method according to the invention and the apparatus according to the invention in order to establish the predetermined property. In particular, the described features of the tactile structure(s) can have a meaningful relation with the tactility of the tactile structure(s) (e.g. same code, supplementary code, check code (redundancy), etc.).

The substrate can be for example a transparent or translucent substrate. The substrate can be formed of bank-note cotton paper or also of bank-note polymer substrate.

A tactile structure is understood here to be in particular a structure having a greater or smaller thickness in comparison to the value-document portions surrounding the tactile structure. Therefore, a partial material thickening or a partial material thinning is present. The material thickening or thinning can preferably amount to at least 1 µm to 20 µm or also up to 40 µm or more, at a substrate thickness of 30 µm to 120 µm.

The tactile structure can in particular be so configured that it can be felt and therefore haptically detected by a person and/or that it is recognizable using a microscopic measuring method.

The method according to the invention for detecting the fitness for circulation of a value document can have the method steps disclosed in connection with the description of the apparatus according to the invention for detecting the fitness for circulation of a value document. Further, it can contain the method steps described in connection with the value document according to the invention. Further, the apparatus according to the invention for detecting the fitness for circulation of a value document can have modules such as are necessary for carrying out the method according to the invention.

It will be appreciated that the features mentioned hereinabove and those to be explained hereinafter are usable not only in the stated combinations but also in other combinations or in isolation without going beyond the scope of the present invention.

DESCRIPTION OF DRAWINGS

Hereinafter the invention will be explained more closely by way of example with reference to the attached figures, which also disclose features essential to the invention. For better illustration, the figures at least partly do without a true-to-scale and true-to-proportion representation, and hatching. There are shown.

DESCRIPTION OF VARIOUS EMBODIMENTS

Figure 1:
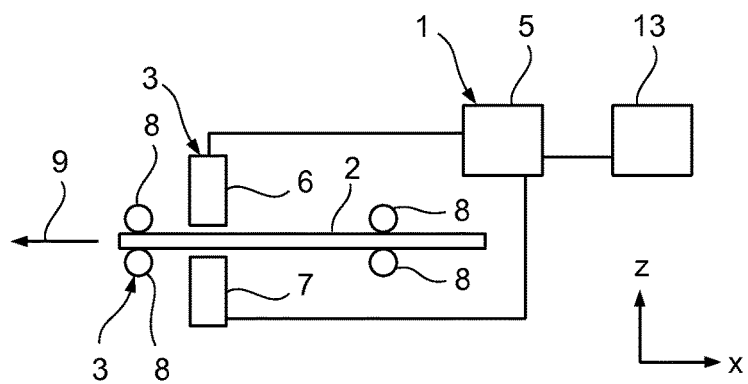
FIG. 1 a schematic representation of a first embodiment of the apparatus 1 according to the invention for detecting a predetermined property of a value document.

In the embodiment shown in FIG. 1, the apparatus 1 according to the invention for detecting a predetermined property of a value document 2 comprises a measurement module 3, a transport module 4 and a control unit 5.

The measurement module 3 has an ultrasonic transmitter 6 and an opposing ultrasonic receiver 7 spaced therefrom. Between the ultrasonic transmitter 6 and the ultrasonic receiver 7 the value document 2 can be moved along a transport direction, indicated by an arrow 9, by means of the transport module 4 represented schematically by four transport rollers 8. Both the measurement module 3 and the transport module 4 are connected to the control unit 5, which actuates the measurement module 3 and the transport module 4 for proper use of the apparatus.

With the apparatus 1 according to the invention, the thickness of the value document 2 can be measured in a predetermined region by means of an ultrasonic measurement.

Figure 2:
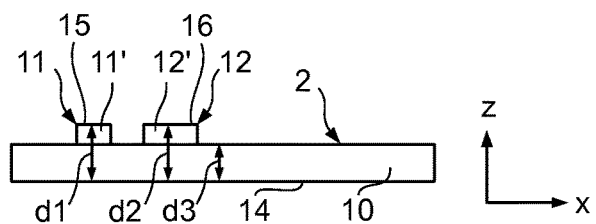
FIG. 2 an enlarged sectional representation of the value document 2 according to the invention according to FIG. 1.

As is evident in the enlarged sectional representation in FIG. 2 of the value document 2, the value document 2 has a substrate 10 (e.g. a bank-note cotton paper with a thickness d3 in the region of 90 µm to 100 µm or a bank-note polymer substrate with a thickness d3 of 90 µm to 95 µm) as well as a first tactile structure 11 and a second tactile structure 12 spaced laterally therefrom. The tactile structures 11, 12 can have for example a foil element 11', 12' applied to the substrate 10, or an element 11', 12' that is imprinted (for example by screen printing or by ink-jet printing). The tactile structures 11, 12 are therefore formed here by the applied element 11', 12' and the subjacent region of the substrate 10. In particular, the tactile structures 11, 12 can be configured as haptically detectable structures, so that e.g. persons with impaired or no vision can feel them. The thickness of the applied elements 11', 12' of the two tactile structures 11, 12 can lie e.g. in the region of 30 µm to 120 µm. Therefore, the value document 2 has a greater thickness d1, d2 in the region of the tactile structures 11, 12 in comparison to the thickness d3 of the structures neighboring thereto (here e.g. regions of the substrate 10 without tactile structures 11, 12).

With the apparatus 1 according to the invention, the thickness d1, d2 of the tactile structures 11, 12 can now be captured by means of an ultrasonic measurement, with the ultrasonic transmitter 6 transmitting ultrasound in the direction toward the ultrasonic receiver 7, and the ultrasonic receiver 7 detecting the incoming ultrasound. The ultrasound is attenuated more or less strongly in dependence on the material and the thickness, so that for example only approx. 1% of the emitted signal is incoming at the ultrasonic receiver. On the basis of the incoming signal one can e.g. determine the thickness d1, d2 of the first and second tactile structures 11, 12.

The thus determined thickness d1, d2 is then compared with a previously known target thickness of the tactile structure 11, 12 by the control unit 5, or a comparison module 13 to which the thus determined thickness d1, d2 is fed. When the measured thickness d1, d2 corresponds to the target thickness or deviates by no more than a predetermined value, the value document 2 is classified as still fit for circulation, so that it can remain in circulation or be put into circulation. When the measured thickness d1, d2 deviates from the target thickness by more than the predetermined value, the value document 2 is classified as no longer fit for circulation and can be removed from service. This greater deviation can occur e.g. due to wear and/or soiling during use of the value document 2.

The determination of the thickness need not be so carried out that the thickness can be stated in a unit of length, such as micrometers. It is also possible for the thickness to be quantified for example by the incoming intensity and/or amplitude of the ultrasonic signal at the ultrasonic receiver 7. This can then be compared with a corresponding reference measurement of a value document 2 having the first and second tactile structures 11, 12 in which the tactile structures 11, 12 have the target thicknesses.

The measured thickness depends not only on the physical thickness of the tactile structures 11, 12 but also on the material of the substrate 10 and of the elements 11', 12'.

The material of the elements 11', 12' may be for example a transparent screen printing ink or a transparent foil. The measurement of the thickness d1, d2 and, where applicable, d3 can be measured in transmission by means of an ultrasonic sensor in the described way. One can also carry out a reflective ultrasonic measurement and use a capacitive ultrasonic sensor. Further, a mechanical scanning (e.g. piezoelectric element), laser profilometry or laser triangulation is possible. The use of an ultrasonic sensor has high process stability and is preferred for fast-running apparatuses 1.

The material of the elements 11' and 12' may further be a screen printing ink with an additional property and a foil with an additional property. The additional property may be one or more of the following properties: luminescence properties (Anti-Stokes, Stokes behavior, phosphorescence), UV absorption (e.g. $TiO_2$), visible properties in the VIS region (VIS=visible wavelength region, approx. 380 nm to 780 nm), IR absorption (=infrared absorption) and/or thermal absorption in the THz region, magnetic properties, electrical conductivity. The stated properties can partly already stem from the binder of the screen printing ink (e.g. UV absorption in the case of UV-drying binders due to the contained photoinitiators, or UV absorption of foils due to the contained light protection agents). The measurement of the thickness d1, d2 and, where applicable, d3 can be effected through mechanical scanning, ultrasonic sensor in transmission, ultrasonic sensor in remission or reflection, laser profilometry, laser triangulation, electromagnetic radiation (UV, VIS, IR, THz), magnetic sensor or capacitive measurement. The optimal sensor selection is dependent in these cases on the additional material or the additional property. For example, a magnetic sensor permits a statement about a layer thickness, due to a remanence measurement. In optical methods, the influence of the light scattering upon evaluation or correlation on the layer thickness is to be taken into consideration.

In this example, the tactility and the intensity of the additional property or of the additional feature correlate. That is to say, a decline of the tactility, due to mechanical abrasion, necessarily also leads to a decline of the additional property. Upon this analysis it must also be taken into consideration, however, that in the course of its circulation the value document can be soiled with various materials which can have an influence on optical properties (UV, VIS, IR) and/or the electrical conductivity. The electrical conductivity of the substrate 10 can e.g. increase through absorption of moisture and salts from perspiration. The IR absorption can increase through soiling of the substrate 10 with soot particles, and the luminescence can decrease through quenching, due to the absorption of e.g. alkaline soiling.

Figure 3:
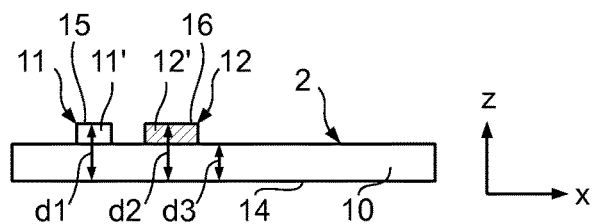
FIG. 3 a sectional representation of a further embodiment of the value document 2 according to the invention.

In a modification shown in FIG. 3, the materials of the two elements 11', 12' of the tactile structures 11 and 12 differ, so that the measurement signals of the measurement module 3 are different for the first tactile structure 11 compared to the second tactile structure 12 in spite of the equal distance d1 and d2 between the underside 14 of the substrate and the respective upper side 15, 16 of the first and second tactile structures 11, 12 (therefore d1=d2).

Since the distances d1 and d2 are equal, the tactility is also equal. The detection of the tactility can be effected e.g. by means of mechanical scanning, ultrasonic sensor (when the attenuation property of the different materials is equal), laser profilometry or laser triangulation. The material properties of the two different elements 11', 12' can be checked with a sensor sensitive to the material properties. In this case the tactility can also be detected indirectly with two different sensors, when the material quantity in the layer thickness correlates with the signal. This is the case for example within certain limits with materials having absorbent properties, such as IR absorption, luminescence properties at low pigment concentration and small contents of scattering particles.

In this example, the tactility and the intensity of the additional feature therefore correlate. That is to say, a decline of the tactility, due to mechanical abrasion, necessarily also leads to a decline of the additional property. In this approach, it must also be taken into consideration, however, that the value document 2 in the course of its circulation can be soiled with various materials which can have an influence on optical properties (UV, VIS, IR) and the electrical conductivity. The electrical conductivity of the substrate can e.g. increase through absorption of moisture and salts from perspiration. The IR absorption can increase through soiling of the substrate 10 with soot particles. The luminescence can decrease through quenching, due to absorption of e.g. alkaline soiling. When the additional properties or the additional features of the different materials behave dissimilarly in circulation, there can be further misinterpretations.

Figure 4:
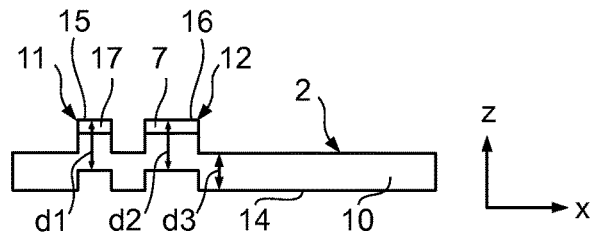
FIG. 4 a sectional representation of a further embodiment of the value document 2 according to the invention.

In FIG. 4 is shown a further modification of the value document 2. In this modification, the two tactile structures 11 and 12 are respectively formed by intaglio printing, with an ink layer 17 being provided for forming the tactile structures 11 and 12 on the regions of the substrate that are formed by intaglio printing.

Therefore, in this exemplary embodiment the thickness dimensions d1 and d2 of the two tactile structures 11 and 12 are greater than the thickness dimension d3 of the substrate 10. Further, the two thickness dimensions d1 and d2 are equal. Through the application of the ink layer, d1, d2 can be for example 1 µm to 20 µm greater than d3.

One can describe the modification according to FIG. 4 in simplified terms also to the effect that an ink-carrying engraving was carried out wherein the tactility is to be attributed predominantly to the embossing and only to a small extent to the applied ink layer 17. The ink or inks of the ink layer 17 can also have additional properties, such as luminescence properties (Anti-Stokes, Stokes behavior, phosphorescence), UV absorption (e.g. $TiO_2$), visible properties in the VIS region, IR absorption (including thermal), absorption in the THz region, magnetic properties, electrical conductivity, etc.

Since the thickness of the ink layer 17 has only a very small share in the tactility, the detection of the tactility is preferably effected with a mechanical scanning or with laser profilometry or laser triangulation. In circulation the embossing can become lower, due to compressive and frictional forces, so that there is a decrease of the tactility.

Besides mechanical scanning, one can also use laser profilometry or laser triangulation to detect the third tactile structure 21. There is hence the possibility here of utilizing a tactile structure with subcoding when two methods are used simultaneously to detect the first and third tactile structures 11 and 21.

As a further variant there can also be provided a combination of the embodiments according to FIGS. 3 and 4. In this case the material property can be equal, and the additional property also be equal by adapting the concentration. For example, the thinner coating contains a distinctly higher content of a same pigment (e.g. IR absorber) to adapt the intensity.

This would lead to the measurement of the tactility leading to an useful result with a mechanical scanning or with a luminescence sensor, while the tactility produced via an embossing method would probably not be recognized with the ultrasonic sensor.

Figure 5:
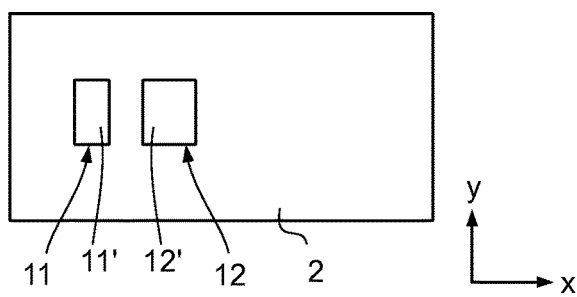
FIG. 5 a plan view of the value document according to the invention of FIG. 2.

As is evident in the plan view, shown in FIG. 5, of the value document 2 according to FIG. 2, the two tactile structures 11, 12 can have different lateral dimensions in the drawing plane according to FIG. 5. The lateral dimensions can be captured with the apparatus 1 according to the invention via the described thickness measurements. Furthermore, there can also be captured the lateral distance of the tactile structures 11 and 12 in the drawing plane according to FIG. 5. The dimensions and/or the distance of the tactile structures 11, 12 can also be utilized as the predetermined property which can be detected by means of the apparatus 1 according to the invention. Therefore, it is possible to detect the dimension of a tactile structure 11, 12 and/or the distance of two tactile structures 11, 12 as the predetermined property of the value document 2 via the thickness measurement.

Figure 6:
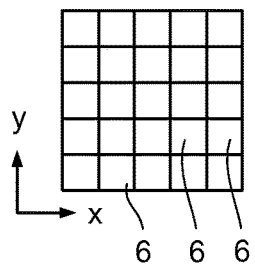
FIG. 6 a plan view of an array of ultrasonic transmitters 6.
Figure 7:
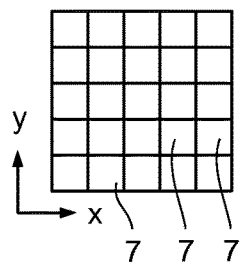
FIG. 7 a plan view of an array of ultrasonic receivers 7.
Figure 8:
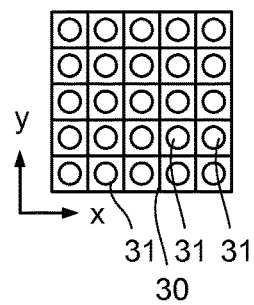
FIG. 8 a plan view of a perforated plate for arrangement between the arrays of ultrasonic transmitters and ultrasonic receivers according to FIGS. 6 and 7.

To carry out such a measurement, the measurement module 3 can have for example (as shown in plan view in FIG. 6) a plurality of ultrasonic transmitters 6 arranged in an array, which are preferably opposed by a plurality of ultrasonic receivers 7 arranged in a same array (as shown in plan view in FIG. 7). Preferably, there is a one-to-one correspondence between ultrasonic transmitters 6 and ultrasonic receivers 7. Furthermore, it is possible to provide between the array of the ultrasonic transmitters 6 and the array of the ultrasonic receivers 7 at least one plate 30 with perforations 31 (which is shown in plan view in FIG. 8) which are arranged in the same array as the ultrasonic transmitters 6 and/or ultrasonic receivers 7. Therefore, a kind of tunnel is provided for each pair of ultrasonic transmitters 6 and ultrasonic receivers 7 to enable the desired measurement to be carried out well.

Figure 9:
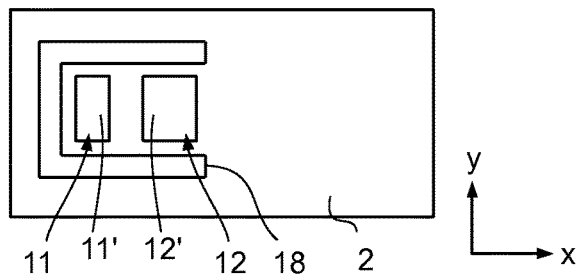
FIG. 9 a plan view of a further embodiment of a value document 2 according to the invention.

In FIG. 9 is shown a plan view of a further embodiment of the value document 2 according to the invention, with the two tactile structures 11, 12 being partly surrounded by a protective structure 18 in this embodiment. Here, the protective structure 18 is configured substantially in a U shape and preferably has the same thickness (perpendicularly to the drawing plane in FIG. 9) as the first and second tactile structures 11 and 12. The protective structure 18 according to FIG. 9 can also be designated an incompletely closed frame or a horseshoe structure.

Figure 10:
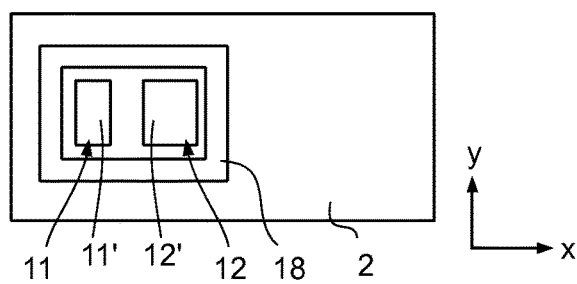
FIG. 10 a plan view of a further embodiment of the value document 2 according to the invention.

The protective structure 18 can of course also surround the tactile structures 11 and 12 completely (for example in a circular or annular shape), as shown in the plan view in FIG. 10. The thickness of the protective structure 18 can also be established by means of the apparatus 1 according to the invention and used for determining the predetermined property.

The protective structure 18 can be configured as mechanical protection for the tactile structures 11, 12 to be checked. In this case the protective structure can be configured from a distinctly more resistant material without an additional property. Thus, the tactile structures 11, 12 can be formed of an embossing, and the protective structure 18 can have a tactile screen print. In the tactile screen print there can additionally be contained inorganic and/or organic particles with high abrasion protection.

In a modification, the protective structure 18 can also be of the same nature as the tactile structures 11, 12 and thus serve as a reference for the tactile structures 11, 12.

In a modification, the protective structure 18 can have an additional feature which is checked with respect to tactility by means of a sensor, while the tactile structures 11, 12 contain no additional feature or only an insecure feature to be checked with respect to tactility.

In a modification, the protective structure 18 does not constitute any protection for the tactile structures 11 and 12 and thus fulfills only the approach of reference. In this case, the protective structure 18 can also be designated the reference structure 18. Further, it is possible that the reference structure can be provided in a distributed manner at more than one position on the value document 2. The form of the reference structure need also not be a frame-like form. In particular, the reference structure 18 can have a dot, a circle and/or a rectangle, a polygon, a square, etc.

Figure 11:
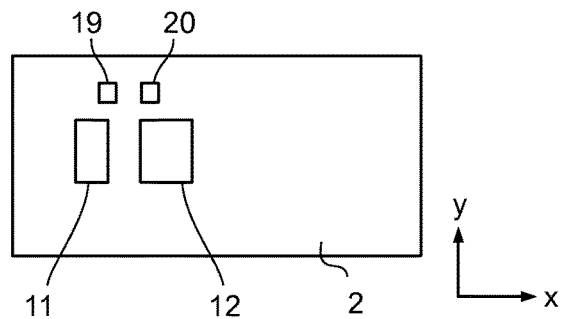
FIG. 11 a plan view of a further embodiment of the value document 2 according to the invention.

In FIG. 11 is shown a further plan view of an embodiment of the value document 2 according to the invention. In this embodiment there are provided further tactile structures 19, 20 besides the two tactile structures 11 and 12. In this case, e.g. the first and second tactile structures 11, 12 can be so optimized in shape and size that they can be especially well detected tactilely by a person with impaired vision. The tactile structures 19 and 20 are then in particular so configured that they can be captured especially well by means of the measurement module 3. The tactile structures 19 and 20 can of course also be optimized in shape and size so as to be especially well detected tactilely by persons, and the first and second tactile structures 11 and 12 for detection by means of the measurement module 3.

Figure 12:
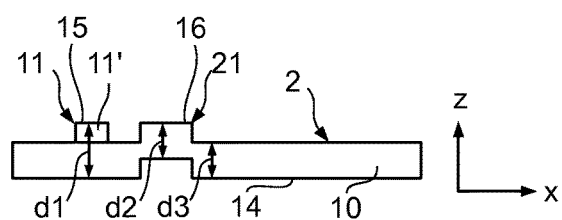
FIG. 12 a sectional view of a further embodiment of the value document 2 according to the invention.

In FIG. 12 is shown a further embodiment of the value document 2 according to the invention in a sectional view according to FIG. 2. In this embodiment, the first tactile structure 11 is configured in the same way as the first tactile structure according to the embodiment of FIG. 2.

A third tactile structure 21 is formed by intaglio printing, so that the thickness dimension d2 of the third tactile structure 21 corresponds to the thickness dimension d3 of the substrate 10. The thickness dimension d1 of the first tactile structure 11 is greater than the other two thickness dimensions d2 and d3. Therefore, the measurement module 3 will not be able to distinguish the third tactile structure 21 from the substrate 10, since the thickness dimensions d2 and d3 are equal. The first tactile structure 11 will be detected due to the greater thickness dimension d1.

Figure 13:
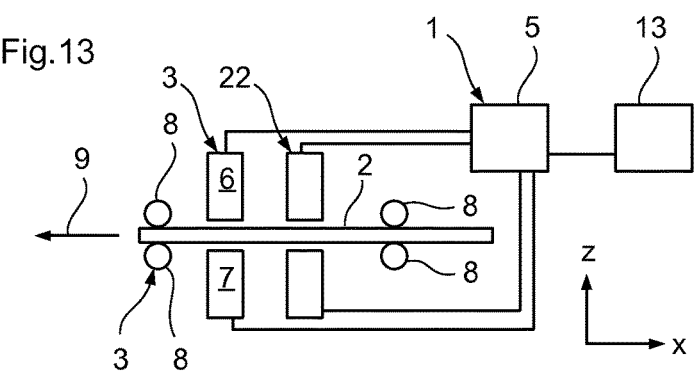
FIG. 13 a schematic representation of a further embodiment of the apparatus according to the invention for detecting a predetermined property of a value document, and FIG. 14 a further embodiment of the apparatus according to the invention for detecting a predetermined property of a value document.

The apparatus 1 according to the invention can be so developed that the upper side and/or underside of the value document 2 is scanned mechanically. For this purpose, a mechanical scanning module 22 can e.g. be provided in addition to the measurement module 3, as represented schematically in FIG. 13. Using the mechanical scanning module 22 the first and the third tactile structures 11 and 21 can be detected due to the mechanical scanning. This combination of ultrasonic measurement and mechanical scanning can be utilized e.g. as an authentication feature of the value document 2.

Further, one can also detect further features of the value document 2 and use them for determining a predetermined property or as an authentication feature. Thus, the applied layers can be detected and evaluated with regard to their color, their visibility in the infrared or UV region, or with regard to other physical properties (such as magnetic properties).

Figure 14:
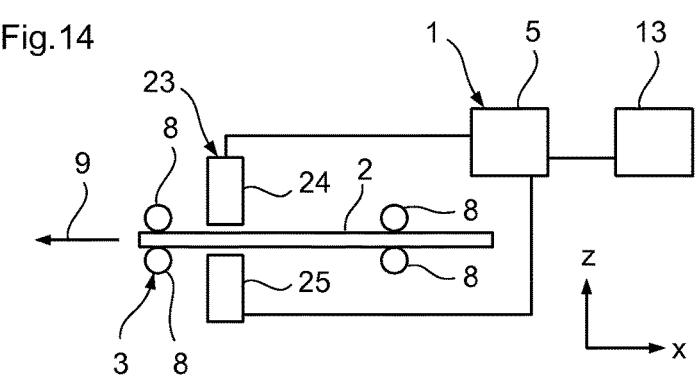

In a further embodiment, the apparatus according to the invention can have instead of the ultrasonic measurement module 3 an electromagnetic measurement module 23 which has a transmitter 24 and a receiver 25, as shown in FIG. 14. The transmitter 24 emits electromagnetic radiation at frequencies in the terahertz region. The measurement signal also in this case depends on the thickness of the traversing portion of the value document 2, so that the above-described thickness measurements and other determinations of predetermined properties of the value document can be carried out in the same way as with an ultrasonic measurement module 3. Further, the electrical conductivity of pigmentations of corresponding inks can be taken into consideration additionally in this case.

It is of course also possible to combine the electromagnetic measurement module 23 with the ultrasonic measurement module 3 and/or the mechanical scanning module 22 in one apparatus.

The invention claimed is:

1. A method for detecting the fitness for circulation of a value document, having the steps of:
   a) carrying out a measurement of the thickness on a tactile structure of the value document using a first sensor, and
   b) comparing the measured thickness with a previously known target thickness of the tactile structure to establish the fitness for circulation, wherein steps a) and b) are carried out for a second tactile structure, said first tactile structure and second tactile structure having equal thickness but comprising different materials such that the measured thickness for the first tactile structure and the second tactile structure differ, wherein the first sensor comprises at least an array of ultrasonic transmitters and an array of ultrasonic receivers, the array of ultrasonic transmitters and the array of ultrasonic receivers being separated by a perforated plate with perforations arranged in a same array as the ultrasonic transmitters and the ultrasonic receivers, and wherein the fitness for circulation is established as not given and the value document is removed from service when the measured thickness deviates from the previously known target thickness by more than a predetermined limiting value.

2. The method according to claim 1, wherein in step a) the thickness of the tactile structure is measured at different positions of the tactile structure.

3. The method according to claim 1, wherein a lateral dimension of the tactile structure is established, which is utilized for establishing the fitness for circulation.

4. The method according to claim 1, wherein a lateral distance of the two tactile structures is established, which is utilized for establishing the fitness for circulation.

5. The method according to claim 1, wherein the target thickness is determined on the tactile structure of a mint-condition value document.

6. The method according to claim 1, wherein in step a) an ultrasonic measurement is carried out.

7. The method according to claim 6, wherein in step a) ultrasound is directed onto the value document from a first side, and detected on the other side of the value document after traversal of the value document.

8. The method according to claim 1, wherein in step a) the thickness measurement is carried out with electromagnetic radiation in the THz region.

9. A value document for a method of claim 1, wherein the value document has a substrate and a tactile structure, formed in a region of the substrate, with a thickness differing from the thickness of the bordering region of the substrate such that the thickness difference is capturable by means of a thickness measurement.

10. The value document according to claim 9, wherein the tactile structure has a structure element made of a material that has at least one phase transition.

11. The value document according to claim 10, wherein the tactile structure is surrounded at least partly by a tactile protective structure.

12. The value document according to claim 9, wherein the tactile structure is surrounded at least partly by a tactile protective structure.

13. An apparatus for detecting the fitness for circulation of a value document, having:

a measurement module for carrying out a measurement of the thickness of a tactile structure of the value document, a comparison module for comparing the measured thickness with a previously known target thickness of the tactile structure in order to establish the fitness for circulation, and a control unit which actuates the measurement module for carrying out the thickness measurement and the comparison module for carrying out the thickness comparison, wherein the measurement module comprises at least an array of ultrasonic transmitters and an array of ultrasonic receivers, the array of ultrasonic transmitters and the array of ultrasonic receivers being separated by a perforated plate with perforations arranged in a same array as the ultrasonic transmitters and the ultrasonic receivers, the comparison module comprises a memory and the control unit comprises a processor.

14. A method for detecting the fitness for circulation of a value document, having the steps of:

a) carrying out a measurement of the thickness on a tactile structure of the value document using a first sensor, b) carrying out a measurement of at least one additional property of the tactile structure using a second sensor, wherein the measured thickness and the additional property correlate, and c) comparing the measured thickness with a previously known target thickness of the tactile structure to establish the fitness for circulation, wherein the first sensor comprises at least an array of ultrasonic transmitters and an array of ultrasonic receivers, the array of ultrasonic transmitters and the array of ultrasonic receivers being separated by a perforated plate with perforations arranged in a same array as the ultrasonic transmitters and the ultrasonic receivers, and the second sensor comprises one of an ultrasonic sensor, an electromagnetic sensor, a magnetic sensor, a capacitive sensor, a laser profilometer, a laser triangulation scanner, an optical sensor or means for a mechanical scanning, and the second sensor is different from the first sensor.

* * * * *